Patented Aug. 3, 1954

2,685,534

UNITED STATES PATENT OFFICE 2,685,534

SHAPED ARTICLES FROM VINYLCHLORIDE POLYMERS AND A PROCESS OF PRODUCING SAME

August Kling, Mannheim, Germany, assignor to Badische Anilin- & Soda-Fabrik Aktiengesellschaft, Ludwigshafen am Rhine, Germany No Drawing. Application January 17, 1951, Serial No. 206,503

Claims priority, application Germany February 4, 1950

4 Claims. (Cl. 117—72)

This invention relates to improved coatings and shaped articles from vinylchloride polymers and a process of producing same.

Coatings and shaped articles from vinylchloride polymers, i. e. polyvinylchloride or interpolymerization products of preponderating amounts of vinylchloride with other compounds having an ethylenic unsaturation, containing softening agents, for example artificial leather prepared therefrom, are slightly tacky when they contain a large amount of softening agent such as is of advantage for obtaining a good stability to cold. Furthermore, with such products, there is always the risk that the softening agent may be dissolved out under the influence of solvents, including oils and fats, whereby an embrittlement takes place. Many articles made from these masses, as for example printing rollers or pressure rollers, have consequently been used only in cases in which they do not come into contact with solvents.

I have now found that coatings or shaped articles of the said kind but which are stable to the influence of the usual solvents employed in practice and which have no tendency to tackiness can be obtained from vinylchloride polymers containing softening agents by applying thereto a coating of polyamides, i. e. high molecular substantially linear polycondensation products from dibasic acids and diamines or from amino carboxylic acids or polyamide forming derivatives of the said substances.

It is, however, often difficult to apply the polyamide layer to the coatings and shaped articles of softener-containing vinylchloride polymers in a firm and non-detachable manner because the polyamides are generally speaking not entirely compatible with the vinylchloride polymers.

It has been further found that the said difficulty can be obviated by interposing between the softener-containing vinylchloride polymer and the layer of polyamide an intermediate layer of softener-containing vinylchloride polymer which also contains polyamide. The polyamide in the intermediate layer is present therein, by reason of its substantial incompatibility with the vinylchloride polymer, practically as a filler in fine dispersion, yet it effects a firm anchoring of the following polyamide layer.

The following examples will further illustrate this invention but the invention is not limited to these examples. The parts are by weight.

Example 1

To a strip of fabric there is applied a priming coating of a paste of 50 parts of polyvinylchloride and 50 parts of softener. To this there is applied a paste of the same composition but which also contains such an amount of an alcoholic solution of a film-forming polyamide from 30 per cent caprolactam, 35 per cent of the adipic acid salt of diaminodicyclohexylmethane and 35 per cent of the adipic acid salt of hexamethylenediamine that the content of solid polyamide amounts to about 2%. To this there is then applied a paste of the same composition but containing 5% of the polyamide. As a covering layer there is applied a coating of a solution of the said polyamide in aqueous methanol. After complete setting at about 160° to 180° C., an artificial leather is obtained having a lustrous, non-sticking surface.

Example 2

In order to prepare a pressure roller, a slightly heated mould for the roller is whirled while containing a paste of 50 parts of polyvinylchloride and 50 parts of softener which also contains 10% of the polyamide specified in Example 1 in the form of solution. There is thus formed on the wall of the mould a coating the thickness of which is determined by the degree of preheating of the mould. After introducing the core of the mould, the mould is filled in the usual way with a softener-containing paste of polyvinylchloride and heated to 160° C. After cooling, a solution of the same polyamide in aqueous methanol is applied to the resulting roller. A coating is thus obtained which adheres extremely firmly and protects the roller in an excellent way against the action of the usual solvents.

Example 3

On to a film of softener-containing polyvinylchloride there is applied a thin layer of a paste of 60 parts of polyvinylchloride and 40 parts of softener which contains 20 parts of the polyamide specified in Example 1 in the form of a solution in aqueous methanol. Onto this layer, which may if desired be lightly set by heating, there is laid a film of a polyamide from caprolactam. The intermediate layer is set by heating to 160° C. under light pressure in a press or between two rollers. A firmly-adherent union with the polyamide film is obtained.

What I claim is:

1. A process for making improved resinous articles which comprises applying an intermediate layer of a mixture of an unmodified high molecular linear polyamide condensation product with a softener-containing vinylchloride polymer between a layer of an unmodified high molecular linear polyamide condensation product and a body having an outer layer consisting of softener-containing vinylchloride polymer, and setting said layers at about 160° C. to about 180° C.

2. A process for making improved resinous articles which comprises applying to a body of softener-containing vinylchloride polymer a first layer of a mixture of equal amounts of said polymer and said softener with an alcoholic solution of an unmodified high molecular linear polyamide condensation product, the solid polyamide amounting to about 2 per cent of the mixture, applying a second layer over said first layer, the second layer being a mixture of equal amounts of said polymer and said softener with an alcoholic solution of said polyamide, the solid polyamide amounting to about 5 per cent of the mixture, applying a covering layer of an alcoholic solution of said polyamide over said second layer, and setting said layers at about 160° C. to about 180° C.

3. A resinous article of manufacture which comprises a coating of an unmodified high molecular linear polyamide condensation product firmly united to a body having an outer surface consisting of a softener-containing vinylchloride polymer through an intermediate bonding layer of a mixture of an unmodified high molecular linear polyamide condensation product with a softener-containing vinylchloride polymer.

4. A resinous article of manufacture which comprises a surface coating of an unmodified high molecular linear polyamide condensation product firmly united to a body of a softener-containing vinylchloride polymer through a first intermediate bonding layer comprising a mixture of about equal parts of said vinylchloride polymer and said softener therefor with said polyamide, the solid polyamide amounting to about 2 per cent of the mixture, and a second intermediate bonding layer over said first layer comprising a mixture of about equal parts of said vinylchloride polymer and said softener therefor with said polyamide, the solid polyamide amounting to about 5 per cent of the latter mixture.

References Cited in the file of this patent

UNITED STATES PATENTS

| Number | Name | Date |
|---|---|---|
| 2,123,155 | Groff | July 5, 1938 |
| 2,188,332 | Carothers | Jan. 30, 1940 |
| 2,260,024 | Hall et al. | Oct. 21, 1941 |

FOREIGN PATENTS

| Number | Country | Date |
|---|---|---|
| 594,075 | Great Britain | Nov. 3, 1947 |